United States Patent
Dietz et al.

(10) Patent No.: US 6,870,148 B2
(45) Date of Patent: Mar. 22, 2005

(54) LED WITH CONTROLLED CAPACITIVE DISCHARGE FOR PHOTO SENSING

(75) Inventors: Paul H. Dietz, Hopkinton, MA (US); William S. Yerazunis, Acton, MA (US); Joshua N. Midgal, Brockton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 59 days.

(21) Appl. No.: 10/453,097

(22) Filed: Jun. 3, 2003

(65) Prior Publication Data

US 2004/0056608 A1 Mar. 25, 2004

Related U.S. Application Data

(60) Provisional application No. 60/412,597, filed on Sep. 20, 2002.

(51) Int. Cl.[7] .................................................. G01J 1/32
(52) U.S. Cl. ..................................... 250/205; 250/214 R
(58) Field of Search ................................. 315/291, 149, 315/155, 156, 159; 250/205, 214 R, 200, 330–334; 359/189, 193, 214

(56) References Cited

U.S. PATENT DOCUMENTS

| | | | | |
|---|---|---|---|---|
| 5,804,997 A | * | 9/1998 | Nishizono et al. | 327/103 |
| 6,122,678 A | * | 9/2000 | Eckel et al. | 710/15 |
| 6,344,641 B1 | * | 2/2002 | Blalock et al. | 250/205 |
| 6,396,614 B1 | * | 5/2002 | Yoshizawa | 250/214 R |
| 6,414,776 B1 | * | 7/2002 | Omata | 359/214 |
| 6,664,744 B2 | * | 12/2003 | Dietz | 315/291 |

OTHER PUBLICATIONS

Mims, "*Siliconnections: Coming of Age in the Electronic Era*," 139–149, McGraw–Hill, New York, NY, 1986.

* cited by examiner

*Primary Examiner*—Wilson Lee
(74) *Attorney, Agent, or Firm*—Dirk Brinkman; Andrew S. Curtin

(57) ABSTRACT

A method and apparatus determining an intensity of light flux. First, a photodiode or LED is charged by reverse-biasing to a fixed voltage. The fixed voltage is a sum of a threshold voltage and a predetermined offset voltage. Then, a time to discharge the photodiode to the threshold voltage by a photo current is measured to determine an intensity of light producing the photocurrent.

14 Claims, 9 Drawing Sheets

LED WITH CONTROLLED CAPACITIVE DISCHARGE FOR PHOTO SENSING

RELATED APPLICATION

This application is a filing of a Provisional Patent Application No. 60/412,597, "LED with Controlled Capacitive Discharge for Photo Sensing," filed by Dietz et al., on Sep. 20, 2002.

FIELD OF THE INVENTION

This invention relates generally to light emitting diodes (LEDs), and more particularly to LEDs used as photo sensors.

BACKGROUND OF THE INVENTION

Light emitting diodes (LEDs) are inexpensive and widely used as light sources. Their diverse applications include numeric displays, flashlights, liquid crystal backlights, vehicle brake lights, traffic signals, backlights, and the ubiquitous power-on indicator light on almost every electronic device, and modern electrical appliances.

Because LEDs are most often used as light emitters, it is often forgotten that they can also operate as photodiodes, i.e., light detectors. Although most LEDs are designed as light emitters, and not light detectors, all LEDs can effectively operate in either mode.

This interchangeability between solid-state light emission and light detection with common LEDs was first described in the 1970's, see Mims, "Siliconnections: Coming of Age in the Electronic Era," 139–149, McGraw-Hill, New York, N.Y., 1986, and Mims, "LED Circuits and Projects," Howard W. Sams and Co., Inc., New York, N.Y., 1973.

Light emitting diodes emit light in a fairly narrow frequency band when a small current is applied in the correct direction through the diode, i.e., with a forward bias. Because the current-voltage characteristic is exponential, it is difficult to control a voltage applied directly across an LED accurately enough to attain a desired current. Therefore, some means must be provided to limit the current. In discrete electronic systems, this is typically done by placing a resistor in series with the LED.

One important application that uses LEDs is optical signal communications. In most prior art optical communications applications, an LED is used in the transmitter, and a photodiode is used in the receiver. In addition, each component is typically driven separately by a specially designed circuit. The photodiodes are most often specifically designed to receive optical signals in a specific narrow frequency range. Most photodiodes cannot emit light. Consequently, there is one circuit that drives the transmitter, and another circuit for driving the receiver. This increases the cost and complexity of the communications system.

In the prior art, a direct and an indirect method are known for using an LED as a photo sensor. In the direct method, the output current or voltage of the LED junction is measured directly. This method requires expensive, low-noise A/D converters when the LED is interfaced with digital circuits.

In the indirect method, the LED junction is first precharged, and then the time it takes for photon-induced leakage to discharge the capacitance of the junction to below a fixed threshold is measured. This method is described in U.S. patent application Ser. No. 10/126,761 "Communications Using Bi-Directional LEDs" Filed Apr. 19, 2002 by Dietz et al, which is a continuation-in-part application of U.S. patent application Ser. No. 10/115,299 "Automatic Backlight for Handheld Devices," filed by Dietz on Apr. 3, 2002.

In the indirect method, the LED junction is reverse-biased by suitably setting micro-controller pins coupled to the LED. The micro-controller pins are then set with the anode held at zero volts, and the signal on the cathode pin is set to be read in as a logic input. The signal on the cathode pin reads as a logic one state. As soon as the micro-controller sets the cathode pin as an input, a timer is started. As the LED is exposed to light, a photocurrent discharges the junction capacitance and causes the voltage sensed by the micro-controller's cathode pin to decrease. When the voltage crosses a threshold, the signal value changes from logical one to logical zero, which is used to stop the timer. The length of time is an inverse function of the incident light flux. If the light flux is high, then the photocurrent is correspondingly high, and the junction capacitance discharges quickly. If the light flux is low, then the photocurrent is small, and the junction capacitance discharges slowly.

As an advantage, the second method does not require the A/D converter as in the first method. However, the time it takes to discharge the junction can be quite long when the photon flux is low. This makes the second method unsuitable for real-time sensing applications or data communication at high speed, when the light flux is low.

Therefore, there is a need for an LED circuit, which can rapidly sense low-level light.

SUMMARY OF THE INVENTION

An optical communications transceiver includes an LED coupled in series with a resistor. A micro-controller has at least one I/O pin connected to the LED. In a first mode or transmit mode, the LED is periodically driving in forward bias to emit light to transmit data. In a second or receive mode, the LED is periodically not driving in forward bias, e.g., reverse bias or zero bias, and then allowed to change charge of the capacitance of the LED's junction using a photocurrent. The change in charge is measured using a timer. When the change in charge exceeds a predetermined threshold, input light is sensed. Thus, the LED can be used to receive data in the second mode. In order to accommodate various levels of light, the charge is controlled to predetermined levels.

DETAILED DESCRIPTION OF THE PREFERRED EMBODIMENT

CMOS Digital I/O Pins

Figure 1:
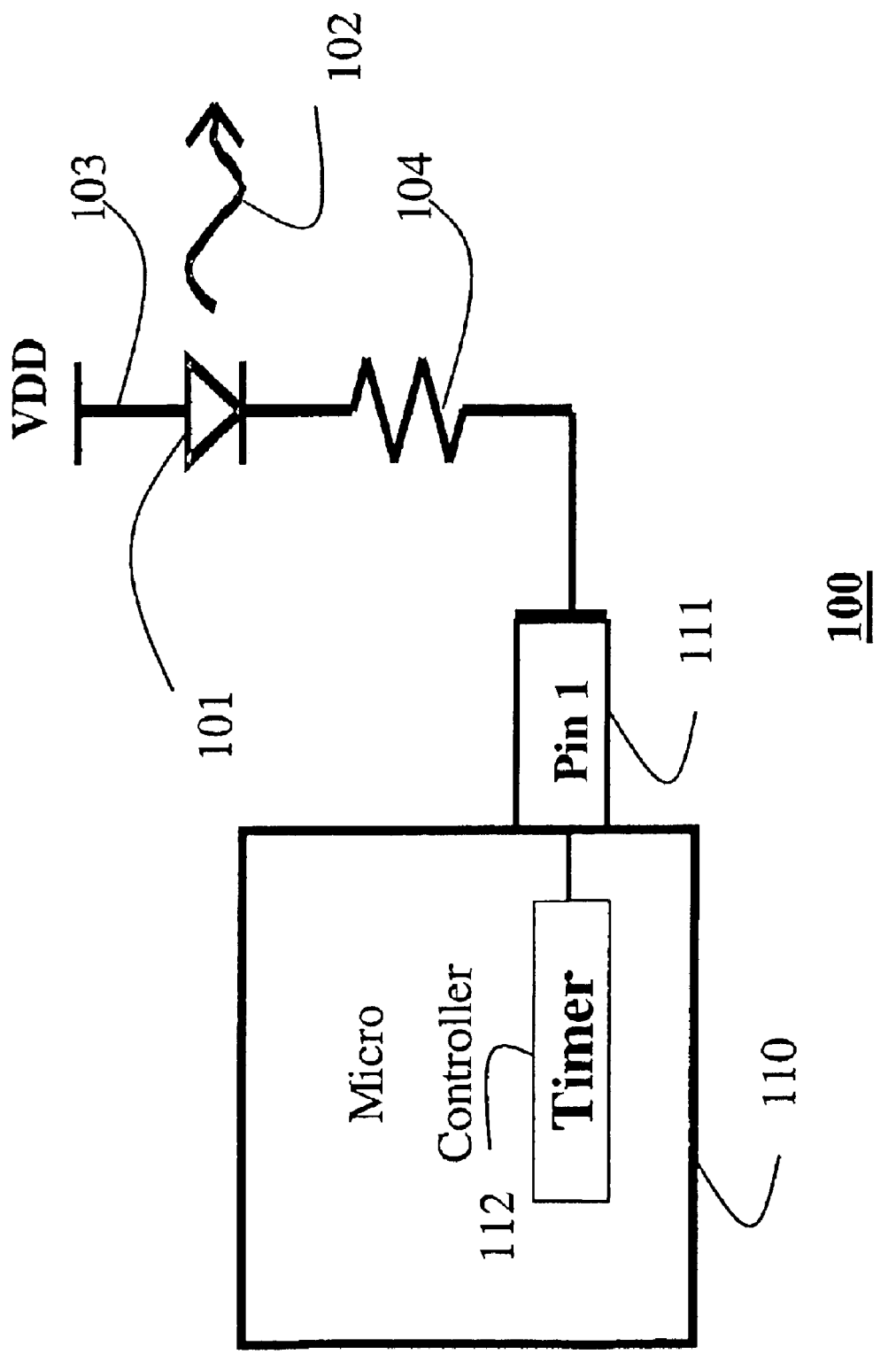
FIG. 1 is schematic of a one pin LED circuit for emitting and detecting light according to the invention.

A typical I/O pin of a conventional CMOS circuit can be in one of three states: output driven high (logical '1'), output driven low (logical '0'), and high impedance input. In input mode, a pin can typically detect a transition from 'high' to 'low' at some digital logic input threshold voltage.

To a first order, this can be modeled as a three-position switch, connecting to either VDD or ground, or neither. In the CMOS circuit, the "switches" are actually implemented with MOS transistors, and thus are not really ideal switches. Most importantly, the transistors have a non-zero and non-linear resistance. The transistors also suffer from charge injection due to stored channel charge under the gates of the transistors. In addition, the circuit includes electrostatic discharge (ESD) protection circuitry.

Keeping currents low and allowing sufficient time for charging of circuit capacitances can minimize the effects of the resistance. In addition, thermal and reliability issues due to phenomena such as electro-migration limit the maximum current that is allowed to flow to or from any pin.

Charge injection turns out to be less problematic than in more general switched-capacitor circuits. I/O pins generally are turning off when signals are either at ground or VDD respectively for N and P type transistors. This means that there is typically not a significant signal dependent component to the charge injection. Also, because one side of each switch is inherently connected to the voltage supply or ground, most of the charge tends to flow to the low impedance side.

However, the lower the circuit impedance, the more fixed charge is injected during turn-off. This usually generates a fixed offset that must be compensated for at the system level.

ESD protection circuits typically include some series resistance and protection diodes to clamp the signal to within a diode drop of the power supply. Because the series resistance is typically small and constant, it introduces few issues beyond normal transistor impedance.

However, the protection diodes do generate a severe constraint that the signals at the I/O pins must remain within 0.6V of the power supply span. For example, this means the I/O pins must not be driven beyond −0.6V to 5.6V, for a 5V system. Exceeding this range will forward bias these diodes and diodes on the junction-isolated transistors, which in the input case, dramatically reduces the input impedance. The protection diodes also inject current into the IC substrate that can cause many problems including "latch-up," which can permanently destroy the device. It is therefore critical to limit signal excursions to within a diode drop of the power supply.

When an I/O pin as used as a more general analog input, a number of issues result. To a first order, the input can be thought of as a comparator determining whether the input is above or below the digital logic input threshold voltage. However, this threshold is typically a strong function of the power supply level, temperature and a variety of manufacturing process dependent factors causing the threshold to vary significantly from device to device.

In addition, the input transistors suffer from significant noise problems, particularly so called "1/f noise" at low frequencies. Thus, it is critical that the overall circuit not depend critically on any particular threshold level. However, it is reasonable to presume that over a very short time period, this threshold is substantially stable.

The techniques used by the invention are not well suited for all CMOS digital I/O circuits. For example, some CMOS inputs specify a minimum transition time. This is due to thermal issues caused by excessive current flows when both the P and N transistors are partially on. Minimizing the time spent in indeterminate logic states helps limit this problem and is generally a good idea for minimizing power consumption.

Some CMOS devices use input circuitry that is more sophisticated than a simple inverter. For example, Schmitt trigger inputs are frequently used on edge sensitive inputs. These circuits have different thresholds depending upon the direction of approach, and this must be taken into account when this type of input is to be used. On very small geometry CMOS processes, leakage can be a very significant problem. Thus, these techniques should be used with extreme care on these sorts of devices to insure that current loss is accounted for.

One I/O Pin System

FIG. 1 shows a circuit 100 that uses an LED 101 to emit and detect light according to the invention. Note, hereinafter, if the circuit is intended only to detect light the LED can be a photodiode in all examples.

As an advantage, the circuit 100 only includes three discrete components, the LED 101, a resister 104, and a micro-controller 110. In the preferred embodiment of the invention, the micro-controller uses CMOS, with operational characteristics and constraints as described above. The micro-controller 110 includes one or more I/O pins, e.g., pin 111, and a timer 112.

As shown in FIG. 1, the LED 101 emits light 102 when a current 103 passes through it in the forward direction, i.e. forward bias. The I/O pin 111 of the micro-controller 110 is used to sink current through an LED 101 with a resistor 104 to limit the amount of current.

Because LEDs have an exponential I-V relationship, the resistor 104 is used typically to limit the current when driving from fixed voltage levels such as is available from I/O pins. Because the I/O pin 111 can generally sink more current than it can source, the typical micro-controller LED drive circuit 100 looks like that shown in FIG. 1.

Two I/O Pin System

Figure 2:
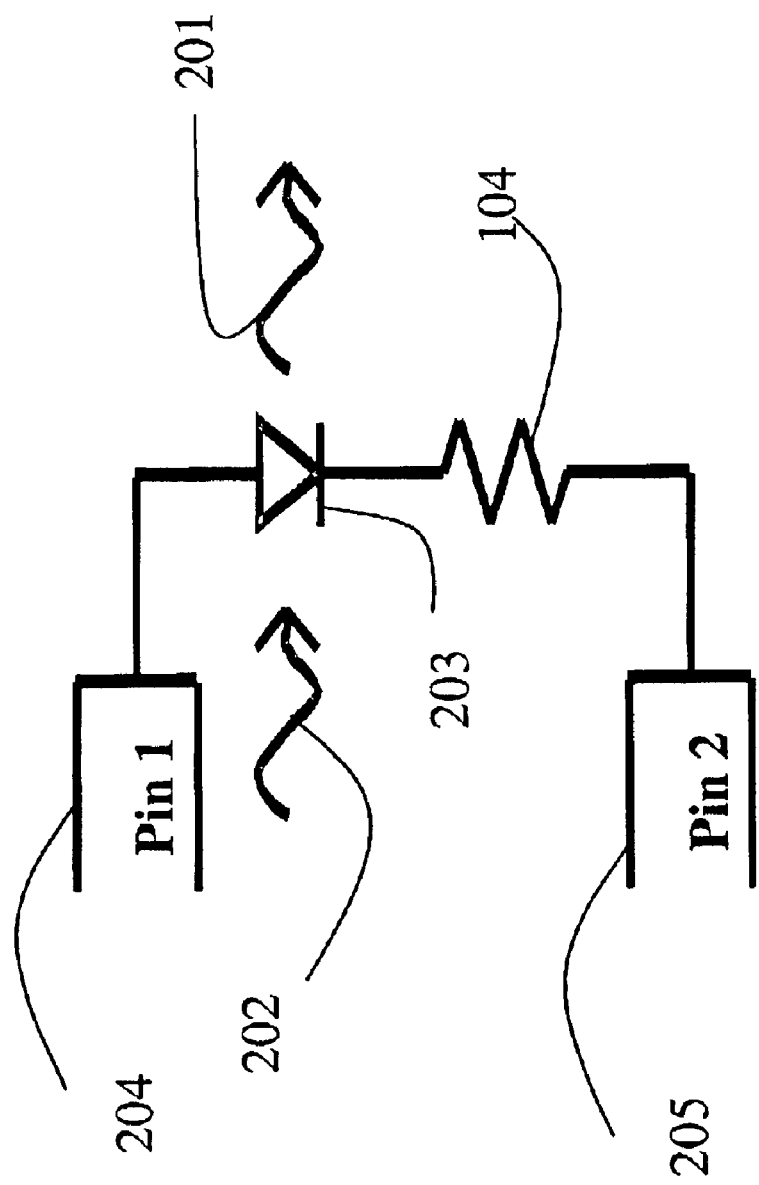
FIG. 2 is schematic of a two pin LED circuit for emitting and detecting light according to the invention.

FIG. 2 shows an LED circuit 200 for emitting 201 and detecting 202 light as used by the invention. Here, the LED-resistor 203–204 combination is connected between two I/O pins 204–205.

Operation of Two I/O Pin System

Figure 3:
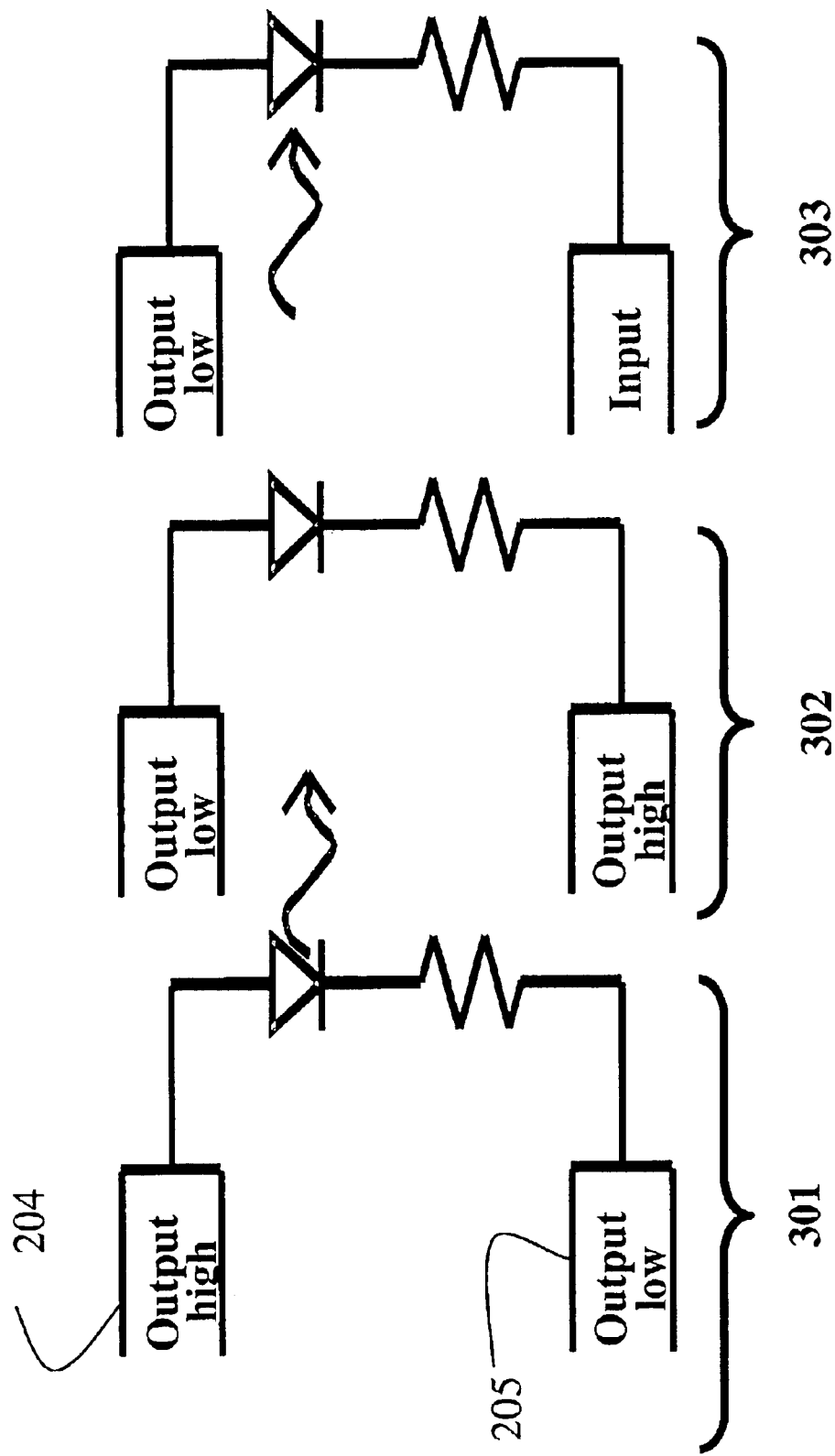
FIG. 3 is a schematic of three states of the two pin LED circuit of FIG. 2.

FIG. 3 shows the operation of the circuit 200, which has three states 301–303. To emit light 301 from the LED 310, pin 204 is set to output high, and pin two is set to output low.

To measure light levels, it requires two states. First, the LED 310 must be reverse biased, charging 302 the capacitance of the junction by setting pin 204 to low output, and pin 205 to high output. Because the junction capacitance is very small, e.g., measured in pico Farads, this happens very quickly, i.e., typically within a clock cycle of the micro-controller.

Then, pin 205 is set to be an input, and the amount of time it takes, e.g., clock cycles as measured by the timer 112 of FIG. 1, for the photo current to discharge 303 to read "low" is measured. Depending on the LED 310 and light levels, this can take on the order of microseconds to seconds. The greater the light flux, the faster the node discharges.

Therefore, it is desired to control the discharge for various light levels.

If it is desired to measure light only down to a modest level, i.e., not too dark, the measurement can happen very quickly. A time out feature can limit the amount of time the controller waits for the LED to discharge to below a logic threshold. By switching quickly back and forth between the states 301–302, the LED can appear to be constantly "on." To prevent visible flicker, there must be no frequency components to the flashing below the human eye flicker fusion frequency. Switching at a rate greater than 60 Hz is generally sufficient to meet this requirement.

It should be noted that because the measurement takes variable time, there can be changes in the LED "on" time duty cycle, and thus the apparent brightness. If this modulation with light intensity is unacceptable, then it can be removed by adjusting the timing to maintain a constant duty cycle, independent of measurement time. This can be achieved by either padding the measurement time to always be a constant amount of time, or by leaving the LED in the "light" state 301 an amount of time proportional to the measurement time.

It is worth noting that this same technique can be used in the reverse direction by setting pin 204 to be an input rather than pin 205 during the discharge state 303. In this case, the input rises in voltage due to the photo current, and thus the time until a logic "high" is reached is approximately inversely proportional to the light flux.

One I/O Pin Bi-Directional LED System

It is also possible to design a one-pin version of the bi-directional LED. In this case, the current sinking circuit of FIG. 1 is used, or its sourcing equivalent. To make a measurement, the pin 101 is driven to the opposite state to force a zero bias condition across the diode. The pin is then set to input, and the photo current is allowed to charge the junction towards forward bias.

When the diode becomes sufficiently forward biased, the voltage across the junction stabilizes, and ceases to increase. If the digital logic threshold is crossed before this occurs, then the timer 112 can be made to determine the light flux. This technique depends on the relationship of the logic threshold level and the turn-on voltage of the LED. Given typical logic thresholds, it is difficult to make traditional low forward voltage drop red, yellow, orange and green LEDs work in this mode. However, blue and new high performance LEDs generally have higher forward voltage drops making them amenable to this technique.

Variable Gain Bi-Directional LED

A fundamental problem with the LED measurement techniques described above is that the time it takes to measure the light flux varies. At a high light flux, the time to discharge can be very fast, limiting the resolution of the timing measurement. At low light levels, the time can be long, limiting the data rate.

Therefore, the invention provides techniques for controlling the sensitivity of the LED measurement system to allow more consistent measurements over a wide range of light levels.

Figure 4:
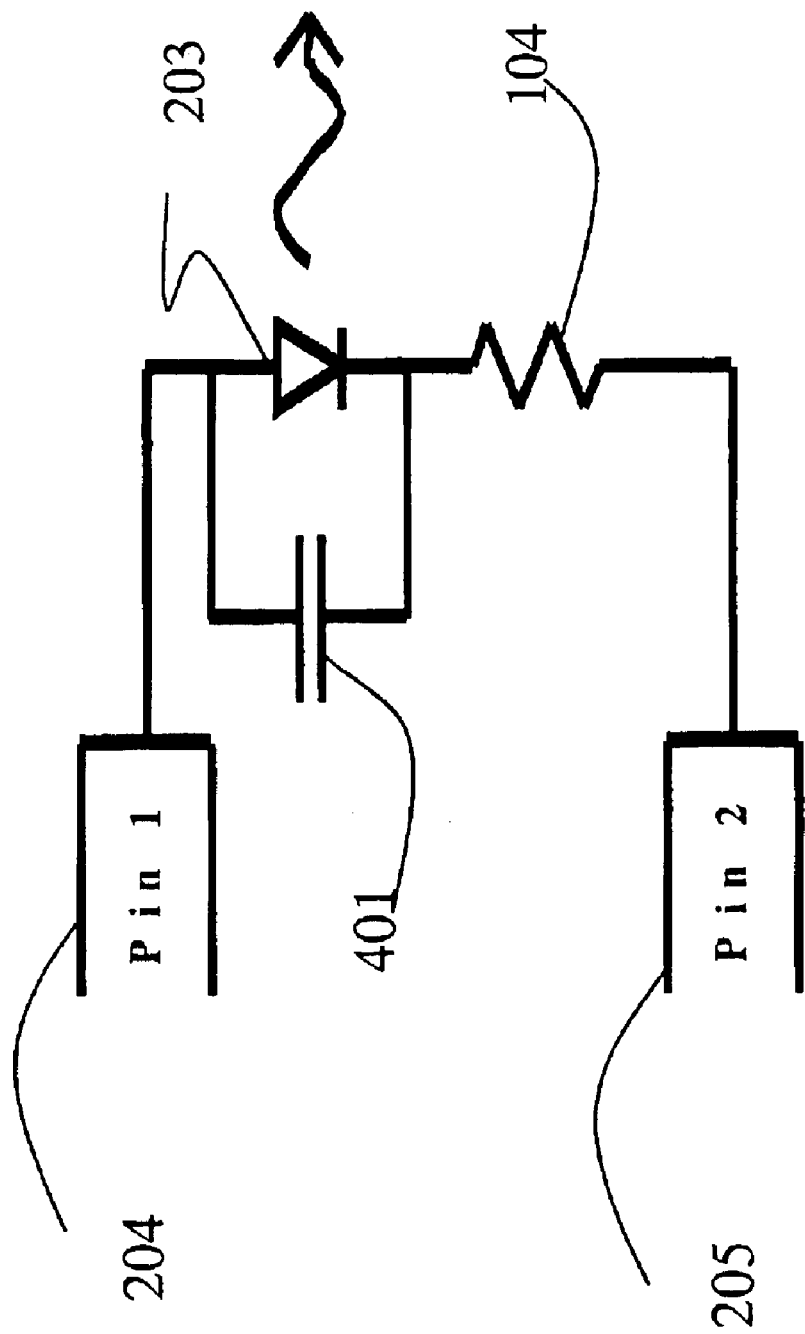
FIG. 4 is a schematic of the two pin LED circuit with an additional capacitor connected across the LED.

As shown in FIG. 4, for high light flux conditions, increasing the capacitance across the LED can reduce the speed of discharge. By placing a capacitor 401 in parallel with the LED 203, the time constants can be made very large, even in bright conditions. This additional capacitance has little impact during the "light" state 301 of operation.

Figure 5:
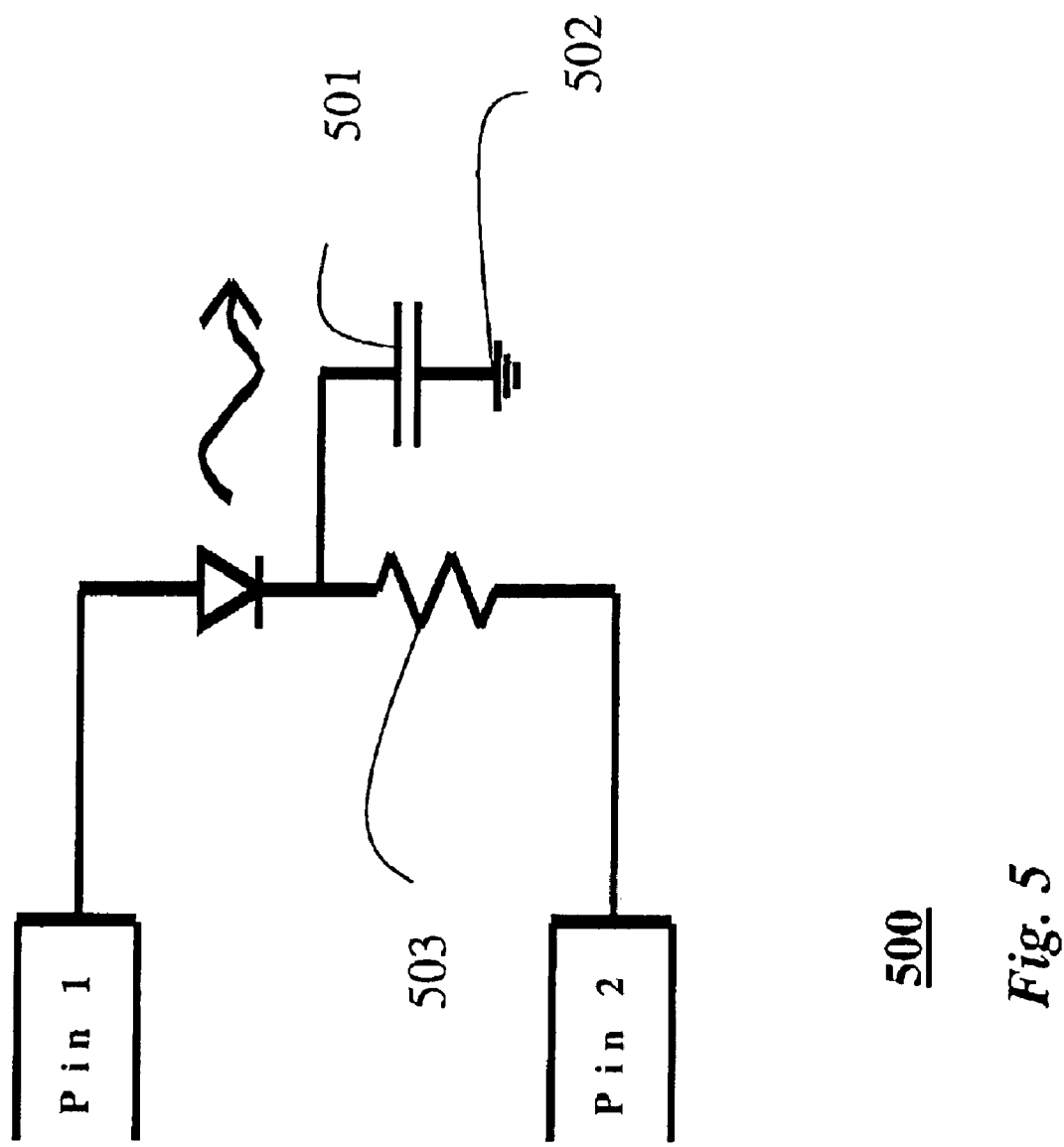
FIG. 5 is a schematic of the two pin LED circuit with an additional capacitor connected to ground.

FIG. 5 shows a circuit 500 that can accommodate varying high-to-moderate light levels. This circuit includes a mechanism for electronically adding or removing the effect of the additional capacitance on an LED 510. If the measurement technique of FIG. 3 is used, then the capacitor is effectively in parallel with the junction capacitance during the measurement phase. However, if we measure at pin 204, then the additional capacitance 501 is effectively grounded 502 through the resistor 503 and does not get charged by the photo current. Thus, this circuit yields two very different time constants for measuring light flux.

Figure 6:
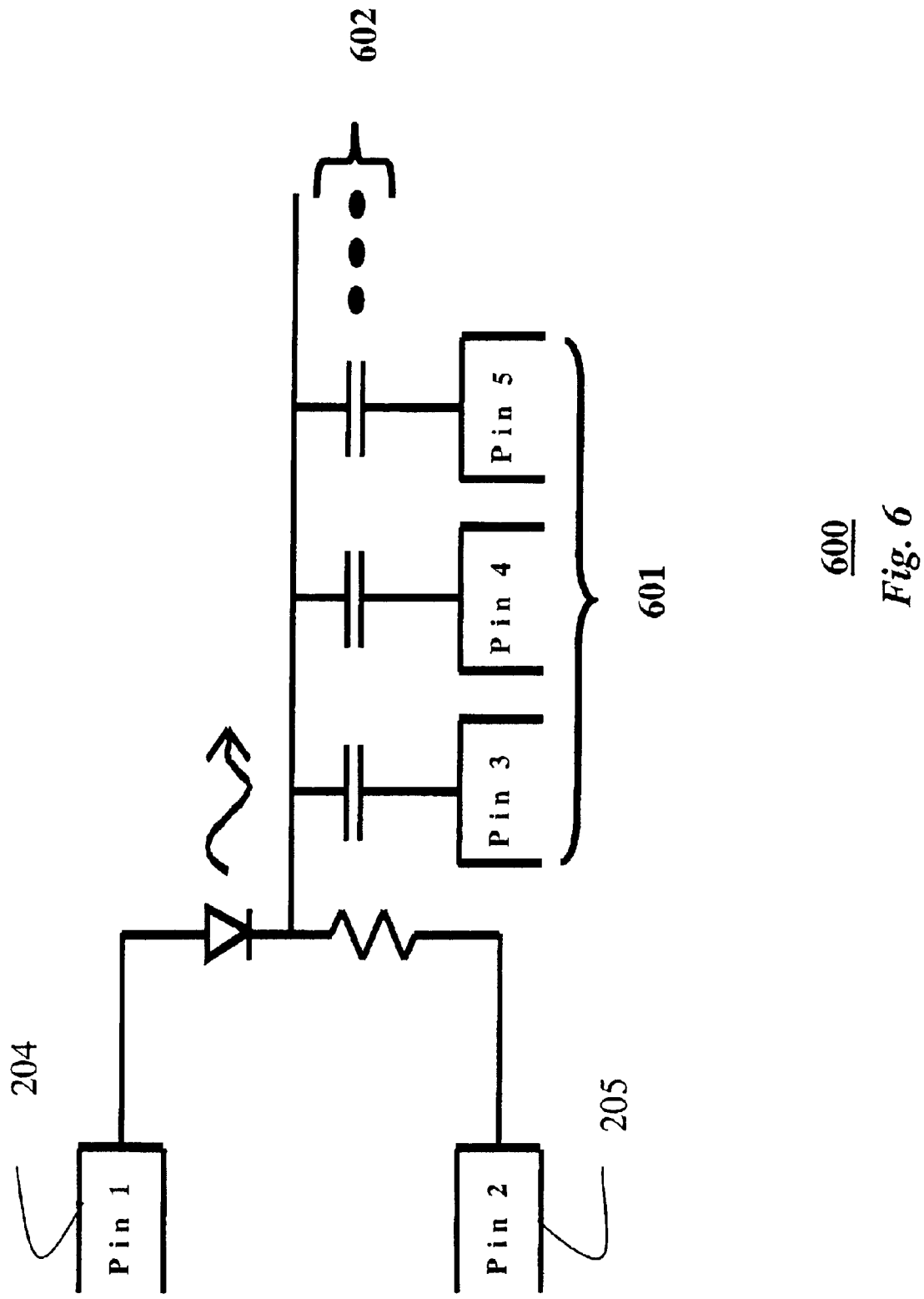
FIG. 6 is a schematic of a multi-pin LED circuit with multiple capacitors.

FIG. 6 shows a circuit 600 that uses additional pins 601 and additional capacitors 602 connected to the output an LED 610. This circuit uses the same three states as shown in FIG. 3. The additional pins 601 are switched to either ground or input to provide an appropriate time constant. The capacitors 602 can be scaled to give linear, logarithmic or any size steps. Also, other networks, e.g., C-2C networks, can be used to limit the component step size span.

Some care should be taken to insure that a disconnected capacitor does not accidentally drive the corresponding input pin beyond the power supply. By occasionally shorting the pins 601 and pin 205 to ground, the swing on these inputs does not exceed the limits.

The techniques for gain adjustment described above are adequate for reducing gain in moderate-to-high light flux conditions. However, different techniques are required for low light levels. Because it is not easy to lower the junction capacitance to decrease the measurement time, an alternative method is required.

One possibility is to pre-charge the junction so that it begins discharging at a voltage very near the logic threshold voltage.

Various techniques are available for pre-charging the junction capacitance. For example, a DAC could be used to specifically set the voltage. However, this would not be in accordance with the desire to have only passive components in the circuits according to the invention.

One could also consider briefly changing the direction of pin 205, i.e., switching the pin between high or low and input, to slowly drive the junction capacitance to the correct level. While sound in principle, this method is not practical. The resistor 104 is a very low value, typically less than 1K Ohm, to give reasonable LED brightness. Given the pico Farad level capacitances involved, the resulting time constants are too short to do anything but fully charge or discharge the junction within the micro-controller clock cycle used to perform timing measurements.

Another solution would use a very large value resistor driven by a separate pin to specifically charge or discharge the junction to the proper level. This too is problematic. The required resistance levels for reasonable time constants are still extremely high and impractical.

Three I/O Pin System

Figure 7:
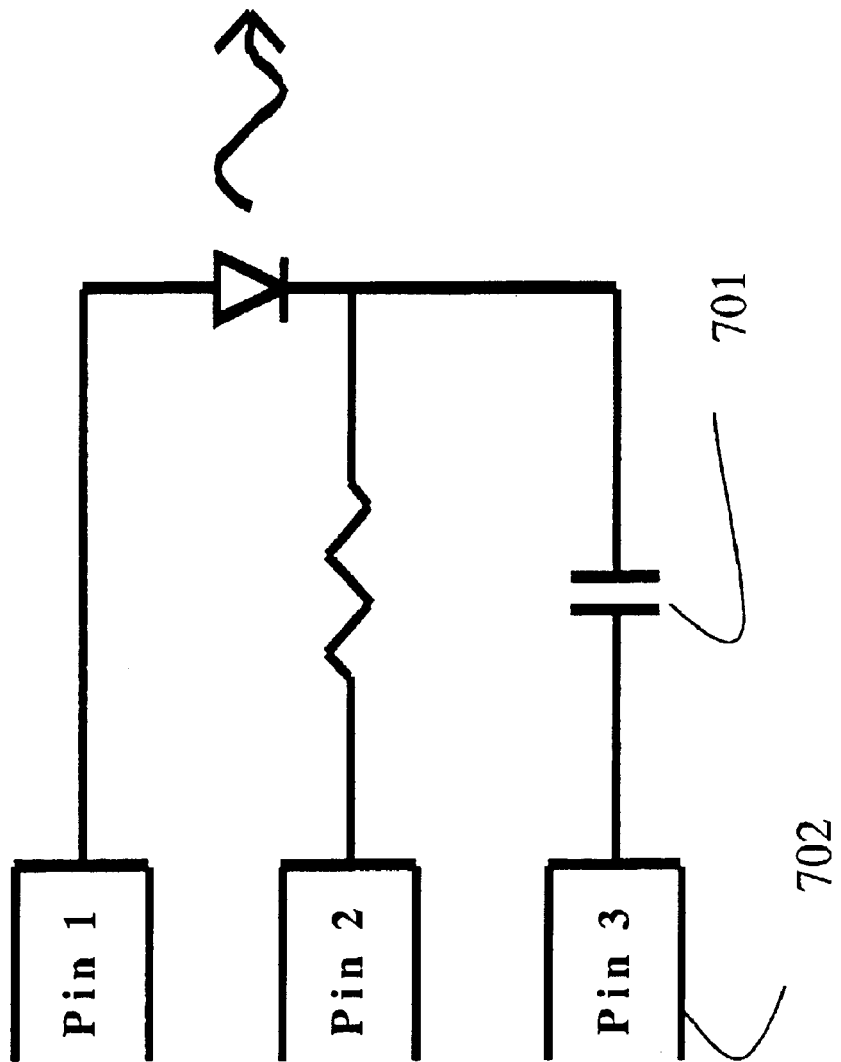
FIG. 7 is a schematic of three pin LED circuit including an additional capacitor.

As shown in the circuit 700 of FIG. 7, a preferred solution uses a capacitor 701 connected between a third I/O pin 702 an LED 710 to allow adjustment of the starting voltage on node 703. The LED is also connected via a resistor 720 to the second pin 205. Changing the starting voltage can dramatically shorten the time to reach threshold for a given light flux.

Figure 8:
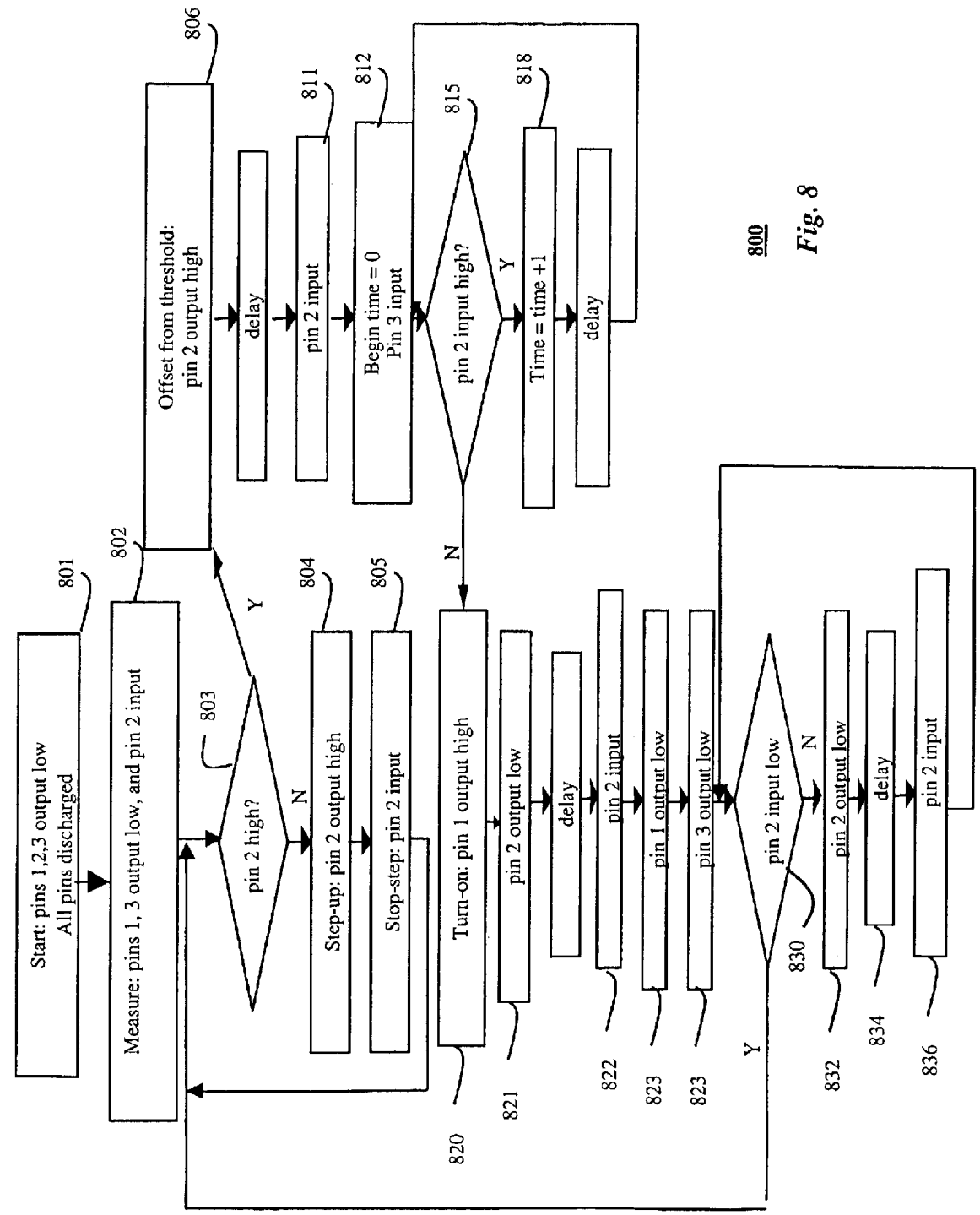
FIG. 8 is a flow diagram of method for controlling a charge on a capacitor in an LED circuit.

The basic operation of the circuit 700 is similar to FIG. 3, except that additional steps, as shown in FIG. 8, are inserted to adjust the reverse bias voltage on the LED to be offset above the threshold by a predetermined amount.

To start, as above, all pins are set 801 to output to initialize the system to a known state. By setting pins one 204 and pin two 205 low and pin three 702 high, the junction capacitance is discharged and the capacitor 701 is fully charged. Then pin two is set 802 to input to prepare to charge the junction.

Steps 803–805 switch pin two between output high and input to incrementally move the voltage up until a threshold is crossed 806. The capacitor used here is much larger than the junction capacitance, yielding a time constant significantly longer than the minimum switching time on the I/O pins. This allows the voltage to be changed very slightly by setting 804 pin two to an output for a minimum time.

After the LED 710 has been charged to the input threshold voltage as closely as possible, we then continue to charge the LED above the threshold level for a short period of time by setting 806 pin two to output high. This sets the reverse bias voltage on the LED to a level slightly above threshold.

Setting pin two back to input 811, concludes the adjustment above the threshold. Now that the junction voltage has been appropriately set, the capacitor 701 is disconnected by setting pin three 812 to input, and the timer is set to zero. The photo current is allowed to discharge the junction until threshold is crossed as detected 815 at pin two, while incrementing 818 the timer.

Because pin three is an input, the photo current is not changing the charge on the capacitor, to a first order. Also, it should be noted that by initially holding pin three high rather than low, the LED can discharge up to the full supply voltage without forward biasing the protection diodes on pin three.

After the measurement is completed, Additional measurements 830 can easily be made or the LED can emit light again using steps 841–842. Because the capacitor 701 still contains the appropriate offset charge, this can be quickly reestablished on the LED by briefly setting 831 pin three to output high. The measurement then proceeds as before. This can be repeated a number of times, however, leakage, 1/f noise and charge sharing will ultimately degrade performance.

To light the LED, pin three is set 841 to output high, and then pin one is set to output high and pin two is set to output low in step 842.

In FIG. 8, the various delays control the effective gain of the system, as well as the apparent brightness of the LED emissions.

Figure 9:
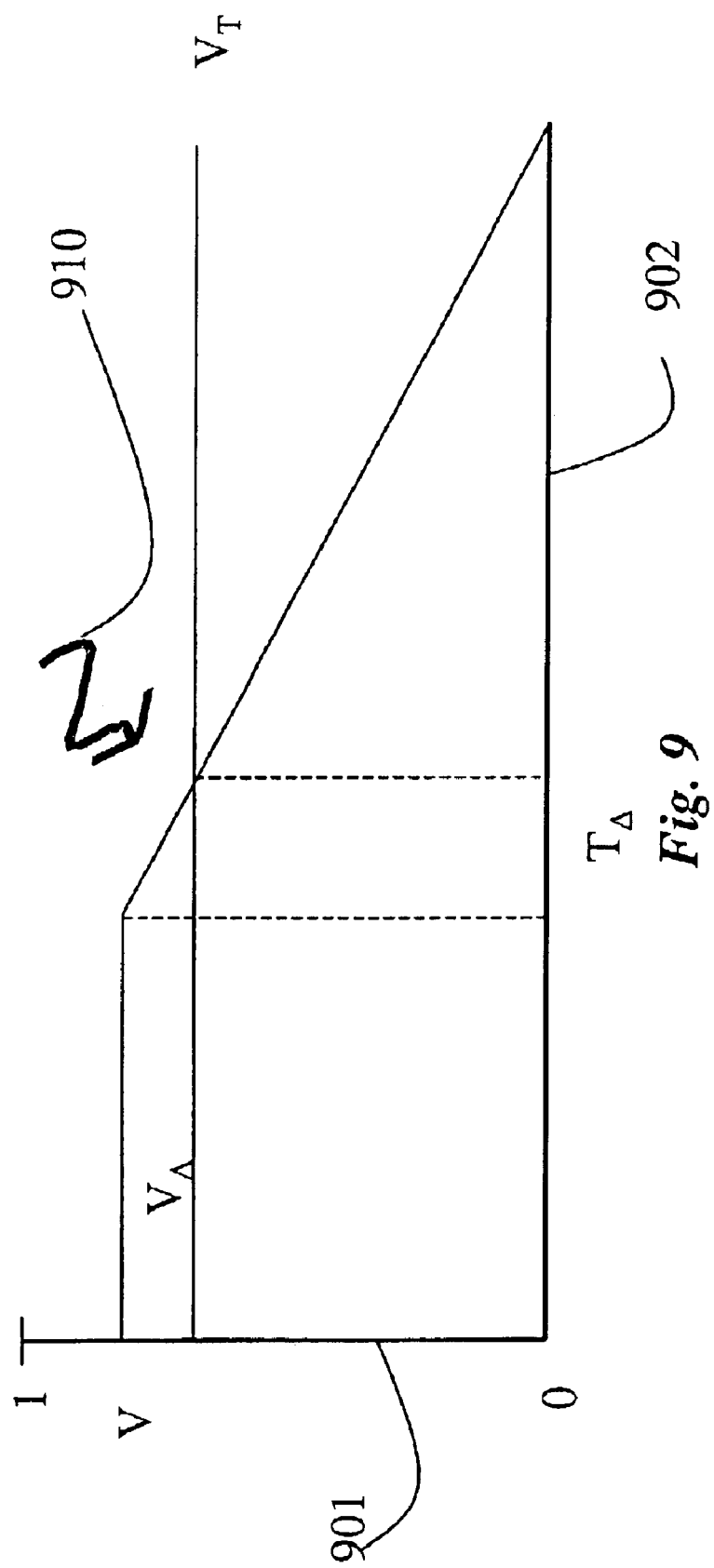
FIG. 9 is a timing diagram of the basic operation of the invention.

The basic operation of the invention can be described with reference to FIG. 9, which shows voltage 901 as a function of time 902. A photodiode, e.g., a light emitting photodiode, is charged to a fixed voltage V. The fixed voltage is a sum of a threshold voltage $V_T$ and a predetermined offset voltage $V_A$. Then, a time $T_A$ to discharge the photodiode to the threshold voltage by a photocurrent is measured to determine an intensity of the light flux 910 that produces the photocurrent.

In a digital circuit, the fixed threshold voltage is known as the digital logic input threshold voltage. This is the voltage at which a logical '0' can be distinguished from a logical '1', as shown. The offset voltage can be set to adjust the sensitivity of the timer. For a high light flux, the offset is proportionally large, and for a low light flux, the offset is small. The photodiode can be incrementally charged to determine the threshold voltage. This is useful, because exact threshold of a particular logic input can vary over time due to temperature changes, fabrication process, supply voltages, 1/f noise, and the like.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. An optical apparatus, comprising:

means for charging a photodiode to a fixed voltage, the fixed voltage being a sum of a threshold voltage and a predetermined offset voltage;

means for applying light to the photodiode, the light inducing a photocurrent in the photodiode, the photocurrent causing the photodiode to discharge; and means for measuring a time to discharge the photodiode to the threshold voltage, the time corresponding to an intensity of the light producing the photocurrent.

2. The apparatus of claim 1 wherein the threshold voltage is a digital logic input threshold voltage of a digital circuit.

3. The apparatus of claim 1 wherein the offset voltage is proportional to a magnitude of the photocurrent.

4. The apparatus of claim 1 further comprising:

incrementally charging the photodiode to determine the threshold voltage.

5. The apparatus of claim 1 wherein the photodiode is a light emitting diode.

6. The apparatus of claim 1 wherein the photodiode is charged by reverse biasing a junction of the photodiode.

7. The apparatus of claim 1 wherein the photodiode is coupled to a first pin of a microcontroller via a resistor.

8. The apparatus of claim 1 wherein the photodiode is coupled to between a first pin and a second pin of a microcontroller via a resistor.

9. The apparatus of claim 8 wherein a capacitor is coupled in parallel with the photodiode.

10. The apparatus of claim 8 wherein a capacitor is coupled between an output of the photodiode and ground.

11. The apparatus of claim 8 wherein a plurality of capacitors are coupled in between an output of the photodiode and a plurality of input pins of the microcontroller.

12. The apparatus of claim 8 further comprising:

a capacitor coupled between an output of the photodiode and a third pin of the microcontroller.

13. The apparatus of claim 5 further comprising:

means for forward biasing the light emitting diode to emit light.

14. A method for determining an intensity of light, comprising:

charging a photodiode to a fixed voltage, the fixed voltage being a sum of a threshold voltage and a predetermined offset voltage;

applying light to the photodiode, the light inducing a photocurrent in the photodiode, the photocurrent causing the photodiode to discharge; and measuring a time to discharge the photodiode to the threshold voltage, the time corresponding to an intensity of the light producing the photocurrent.

* * * * *